No. 749,868. PATENTED JAN. 19, 1904.
J. F. KRCMA.
POWER TRANSMISSION DEVICE.
APPLICATION FILED JULY 23, 1903.
NO MODEL. 3 SHEETS—SHEET 1.

No. 749,868. PATENTED JAN. 19, 1904.
J. F. KRCMA.
POWER TRANSMISSION DEVICE.
APPLICATION FILED JULY 23, 1903.
NO MODEL. 3 SHEETS—SHEET 2.

Witnesses
Edward Barrett
Harold G. Barrett

Inventor
John F. Krcma
By Charles M. Hill
Atty.

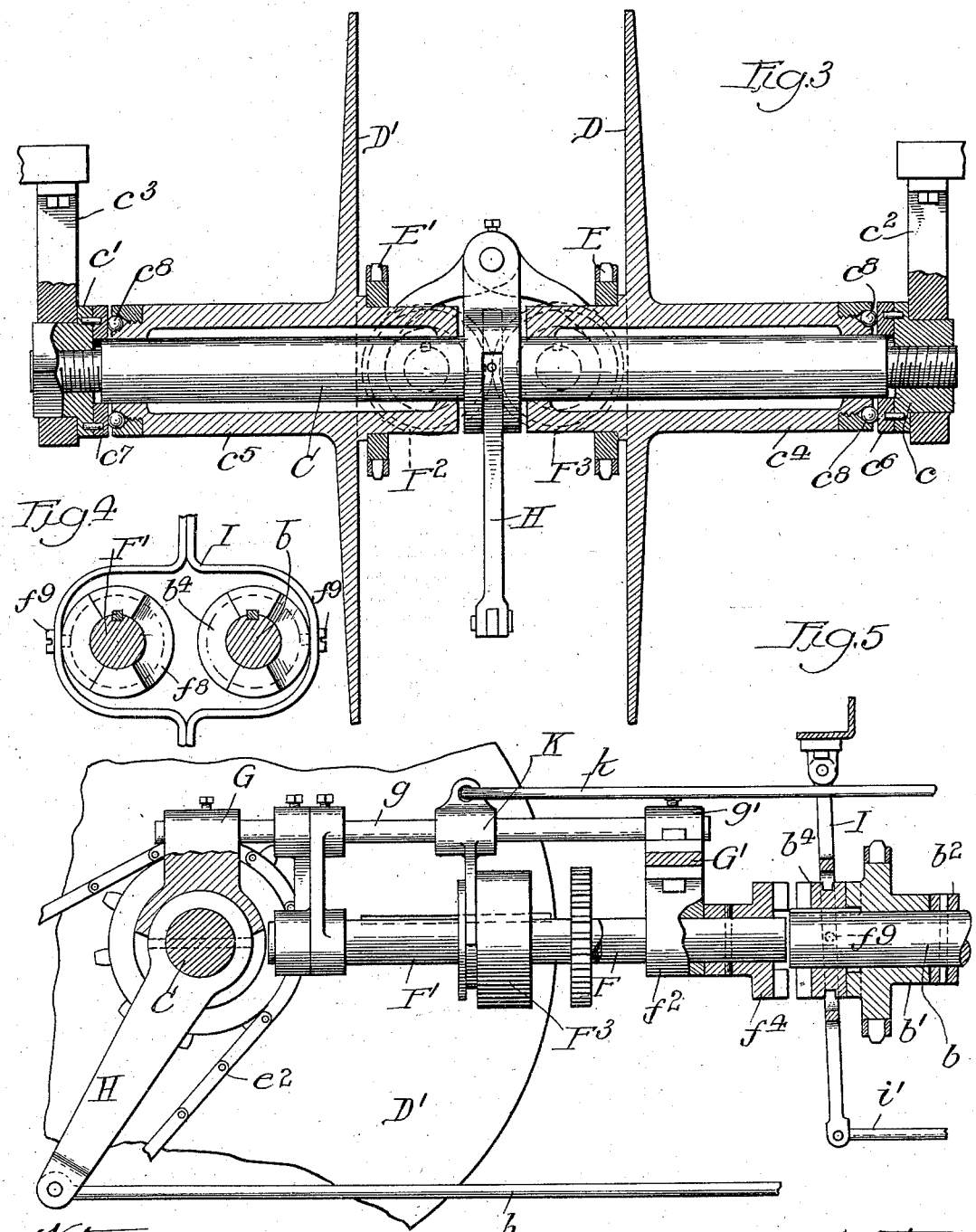

No. 749,868.

Patented January 19, 1904.

UNITED STATES PATENT OFFICE.

JOHN F. KRCMA, OF CHICAGO, ILLINOIS.

POWER-TRANSMISSION DEVICE.

SPECIFICATION forming part of Letters Patent No. 749,868, dated January 19, 1904.

Application filed July 23, 1903. Serial No. 166,725. (No model.)

*To all whom it may concern:*

Be it known that I, JOHN F. KRCMA, a citizen of the United States, and a resident of Chicago, in the county of Cook and State of Illinois, have invented certain new and useful Improvements in Power-Transmission Devices; and I do hereby declare that the following is a full, clear, and exact description of the same, reference being had to the accompanying drawings, and to the letters of reference marked thereon, which form a part of this specification.

This invention relates more particularly to a reversible and variable speed power-transmission device for constant-speed motors adaptable for use in propelling vehicles and for many other purposes.

Heretofore many different constructions have been devised for transmitting power, some of which have operated by friction. It has been an objection, however, with the various friction devices that it has been difficult to vary the speed independently of the speed of the motor, and it has also been an objection that where power-transmission devices operated by friction have been used if provision is made to vary the speed by shifting the friction-pulleys such shifting of said pulleys frequently varies the pressure of the interacting friction members and greatly detracts from the utility of the device.

The object of this invention is to provide a cheap, simple, and very durable construction in which any desired frictional contact can be secured, the pressures of the friction members being varied at will, and also to enable the speed to be varied independently of the speed of the driving-shaft by shifting the friction disk or members with respect to each other without varying the pressure of contact.

It is also an object of the invention to provide a very simple reverse mechanism operating independently of the motor, which may be driven at constant speed.

For convenience of illustration I have embodied the invention in an automobile, though obviously the same is adaptable for use in many other purposes.

The invention consists in the matters hereinafter described and more fully pointed out and defined in the appended claims.

Figure 1:
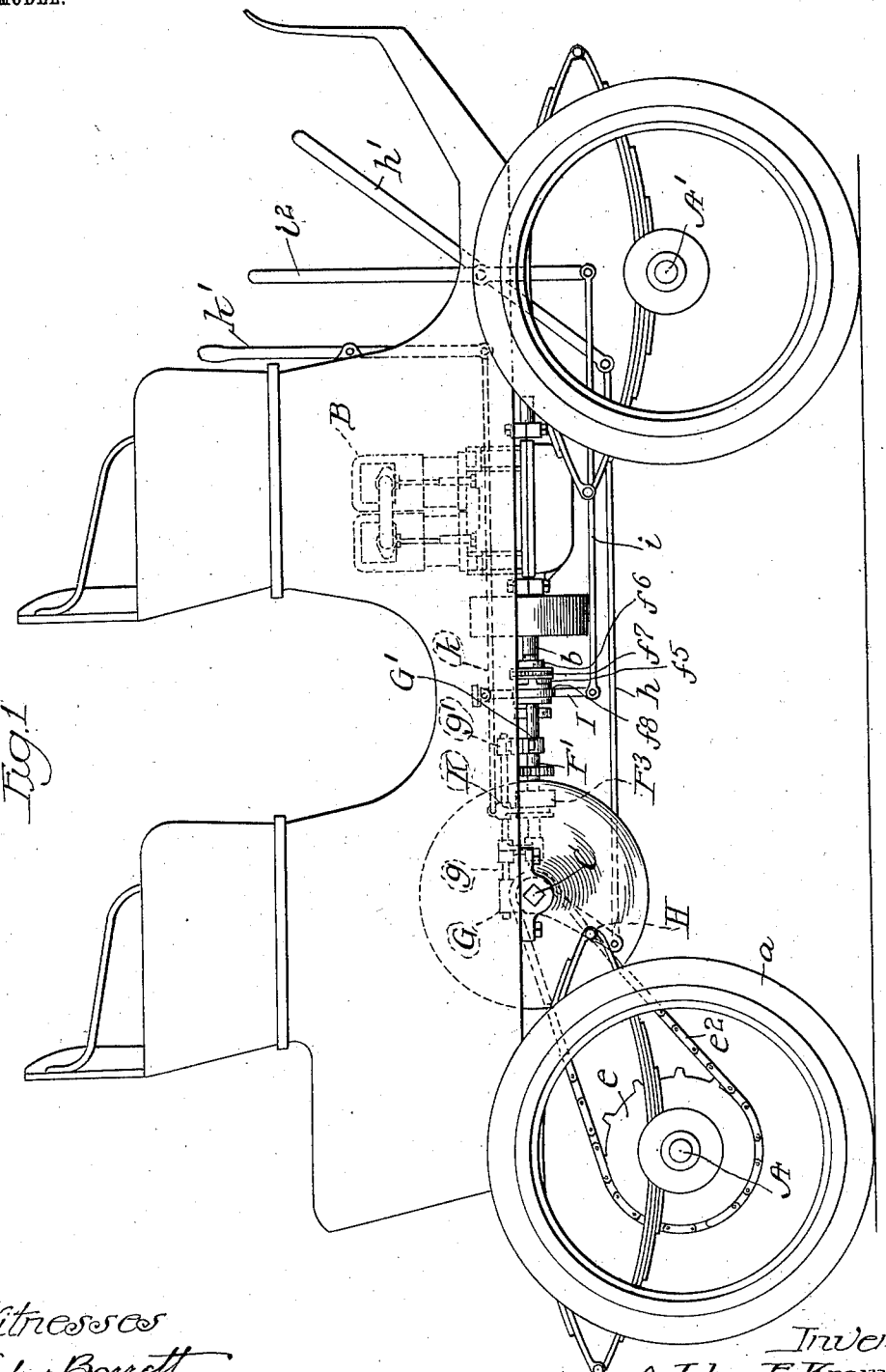
Figure 2:
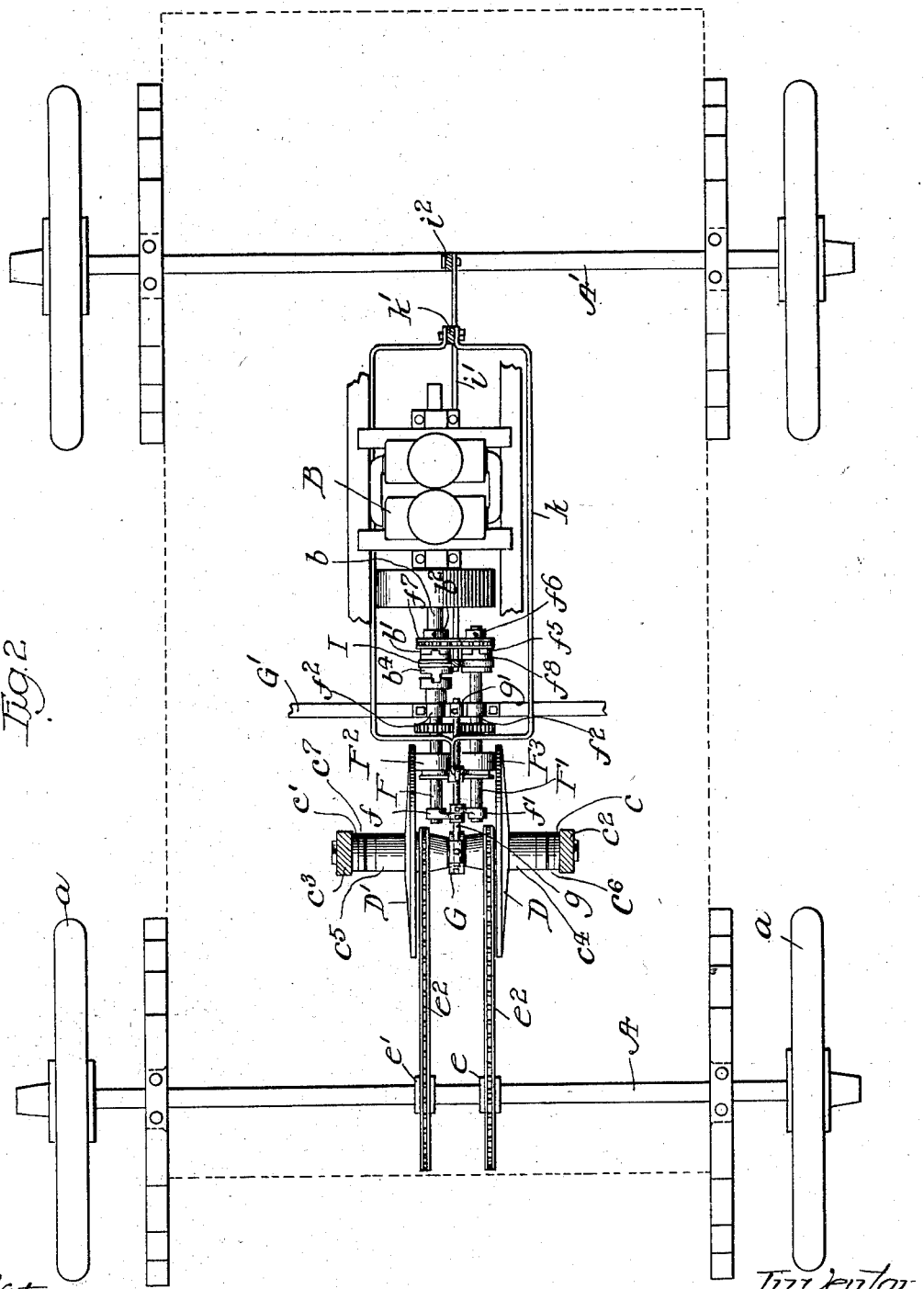

In the drawings, Figure 1 is a side elevation of a device embodying my invention, showing the same mounted upon an automobile. Fig. 2 is a top plan view of the same. Fig. 3 is an enlarged vertical section taken longitudinally of the main friction-shaft. Fig. 4 is an enlarged transverse section taken through the clutches. Fig. 5 is an enlarged central section taken longitudinally between the friction-disks.

As shown in said drawings, the construction is embodied as a part of a driving mechanism for an automobile, in which A and A' are the axles of the vehicle, of which the axle A, as shown, is rotatable, and the wheels $a\ a'$ are secured thereon and driven thereby, and the power of the motor or engine B, preferably a constant-speed motor of any desired kind, is communicated thereto, thereby propelling the vehicle. Said vehicle-frame may be of any desired construction or type and mounted as preferred; but in the construction shown said engine is supported intermediate said axles, with its driving-shaft $b$ extending centrally of the vehicle and rearwardly, as shown in Fig. 2. Supported transversely of the vehicle-frame, intermediate the axle A and the motor B, is the friction-shaft C, which, as shown, is provided at its ends with right and left threads engaged by complemental nuts $c$ $c'$, which are angular on the outside and engage in complemental apertures in hangers $c^2$ $c^3$, which are bolted to the vehicle-frame, as shown in Fig. 3, and which hold said nuts from rotation. Journaled on said shaft C are the inwardly-facing friction-disks D and D', each of which is provided with an elongated hub $c^4$ $c^5$, extending on each side therefrom and which are provided in their outer ends adjacent said nuts $c$ $c'$ with a groove, which together with a hard-steel washer $c^6$ afford a ball-race in which are antifriction-balls $c^8$. A narrow space intermediate the inner ends of said hubs is provided to permit of adjustment of the disks D D' with respect to each other, and the interior of each hub is cored out, providing bearing on the shaft only at the ends of the hubs and affording a chamber for lubricant within each hub and surrounding the shaft. Secured on the inner ends of the hub between the friction-disks are sprocket-wheels E and E', which are in alinement with corresponding sprocket-wheels $e\ e'$ on the axle A and are connected therewith by sprocket-chains $e^2$ in a familiar manner. Adjustably secured on said shaft between said friction-disks is a lever H, which, as shown, extends downwardly and is connected at its lower end with the forwardly-extending rod $h$, pivotally engaged at the lower end of an operating-lever $h'$, extending into convenient position to be actuated by an operator and whereby said lever H may be moved forwardly or rearwardly, partly rotating the shaft and adjusting said friction-disk toward or from each other. Also mounted centrally on said shaft and slotted circumferentially to engage over the upper end of said lever H is an upwardly-extending bracket G, in which is rigidly secured one end of the longitudinal non-rotative shaft $g$, the other end of which is rigidly secured in a suitable bearing $g'$, secured on a transverse frame member G', as shown in Figs. 1 and 5. Said shaft $g$ affords a support for longitudinal friction-shafts F and F', hereinafter described, and acts as a slide bar or guide whereon the means for shifting the friction-rollers on said friction-shafts are carried. Said shafts F and F' are parallel and journaled at their inner ends in hangers $f\ f'$, carried on the shaft $g$ and at their outer or front ends are journaled in boxes $f^2$, rigidly secured on the under side of said frame member G', as shown in Fig. 5, and are each provided with a friction-roller $F^2\ F^3$, slidable thereon by means of a feather or the like and which when adjusted, as shown in Figs. 1 and 2, bear against the respective friction-disks D and D' and against each other, whereby said friction-rollers $F^2$ and $F^3$ act with approximately equal force with rotative effect on said disks D and D' when either of said shafts are rotated.

As shown, the shaft F is shorter than the shaft F' and in alinement with the shaft $b$ of the motor and terminates in close relation therewith, and a clutch member $f^4$ is rigidly secured at its extremity corresponding with a clutch member $b'$, rotatably secured on the driving-shaft $b$ and having a positive bearing at its front end against a collar $b^2$, rigidly secured on said shaft. Between said clutch members $f^4$ and $b'$ and feathered on the shaft $b$ is a slidable double-ended clutch member $b^4$. A clutch member $f^5$, similar to the clutch member $b'$, is revolubly engaged upon the front end of the shaft F' opposite the clutch member $b'$ and bears against a collar $f^6$, secured on the front end of said shaft. Each of said revoluble clutch members $b'$ and $f^5$ has a sprocket-wheel thereon, around which is trained the sprocket-chain $f^7$, and a slidable clutch member $f^8$ is feathered on said shaft F' opposite the clutch member $b^4$ on the end of the shaft $b$. Means are provided for simultaneously moving said sliding clutch members longitudinally of said shafts, comprising a lever I, pivoted on the under side of the frame, as shown in Figs. 1 and 5, and provided with a central yoke which engages around said sliding clutch members, and, as shown, is provided with set-screws $f^9$ on opposite sides, which engage in grooves in said clutch members and act so that movement of the yoke longitudinally of the frame moves both of the same simultaneously. On the lower end of said lever I is provided a forwardly-projecting rod $i'$, which at its front end is pivotally engaged on the lower end of an operating-lever $i^2$, which extends upwardly to a position to be engaged by the operator.

Each of the friction-rollers $F^2$ and $F^3$ is provided with a circumferential groove, as shown in Figs. 2 and 5, in which engages the arm or arms of a yoke K, slidably secured upon the shaft $g$, and which acts to move said friction-rollers radially of the disks D and D'. As shown, a rod $k$ is connected at its rear end with the yoke K and extends forwardly and is pivoted to a lever $k'$ in position to be conveniently engaged by an operator.

The operation is as follows: The friction-rollers $F^2$ and $F^3$ being in positive engagement with the friction-disks D and D' and in contact peripherally with each other, the driving of either of said friction-rollers from the source of power acts to simultaneously rotate the disk in the same direction and the axle A propelling the machine. If the clutch member $b^4$ on the shaft $b$ is slid into engagement with the clutch member $f^4$ on the shaft F, the propulsion is forwardly and the clutch members $b'$ and $f^5$ are idle. Should it be desired to reverse the motion of the driving-shaft A, or, in other words, back the vehicle, the lever $i^2$ is actuated to draw said sliding clutch members $b^4\ f^8$ forwardly into engagement with the clutch member $b'\ f^5$ on the shafts $b$ and F', respectively. Said sliding clutch members hold the same from rotation on the said shafts, and the rotation of the main driving-shaft $b$ is now communicated to the shaft F' by means of the sprocket-chain $f^7$, reversing the rotation of the friction-rollers and driven shaft A. The simplicity of this reverse movement is obviously a matter of the utmost importance, inasmuch as there are no gears required and all the mechanisms ordinarily used for reversing being entirely out of action except when backing or reversing, thereby avoiding wear of the parts. Obviously the speed can be very conveniently varied without varying the speed of the motor or engine by the adjustment of said friction-rollers radially inwardly or outwardly of the same. Adjusting the same nearer the centers of said disks acts to increase the speed of the rotation of the disks and the velocity of the vehicle or the like, while the outward adjustment thereof or adjustment toward the periphery of said disks acts to decrease the speed. Furthermore, by means of the lever $h'$ the frictional contact of said disks on said friction-rollers can be varied at will, the partial rotation of the shaft C thereby acting to force said disk inwardly into positive frictional contact or permit the same to slide outwardly sufficiently to be out of contact, permitting the driven shaft to come to rest without stopping the motor. This is owing to the oppositely-threaded extremities of the shaft moving the nuts $c\ c'$ inwardly and outwardly, depending upon the direction of rotation of the shaft, and correspondingly shift the disks. Inasmuch as it is possible to vary the friction-pressure of the disk upon said rollers and of the rollers against each other there can be no appreciable slip of said friction members under ordinary circumstances. Such slipping, however, may be entirely obviated by providing intermeshing spur-gears on each of the shafts F and F' beyond the periphery of the disks D and D'.

Obviously the construction is adaptable for use for many different purposes, and if used in an automobile as shown and described is capable of installation in very small space and in conjunction with any type of motor.

I do not desire to be limited to a variable-speed transmission and reversing mechanism for automobiles only, as obviously that is but one of many uses to which my invention can be applied.

Obviously many details of construction may be varied without departing from the principles of this invention.

I claim as my invention—

1. The combination with a motor and its driving-shaft, of a frictional roller in peripheral engagement therewith, rotatable friction-disks engaging one on each side of said pair of friction-rollers, a rotative shaft, a non-rotative nut on each end thereof, adapted when said shaft is rotated to move said disks oppositely and a shaft operatively connected with said friction-disks and driven thereby.

2. The combination with a pair of inwardly-facing friction-disks, of friction-rollers engaged between the same and in mutual peripheral contact, means for rotating one of said rollers thereby rotating the other and said friction-disks simultaneously, a shaft operatively connected with the friction-disks and driven thereby, a rotative shaft loosely carrying said friction-disks and means on the end of said shaft adapted to regulate the pressure of said disks on the rollers.

3. The combination with inwardly-facing friction-disks having their faces in parallel planes, of friction-rollers engaged between the same and mutually engaging each other peripherally, an oppositely-threaded rotative shaft extending oppositely through said disks, means on the end thereof adapted when said shaft is rotated to vary the pressure of said disks on said roller, a constant motor and operative connections between the motor and both of said friction-rollers whereby either may be rotated thereby and whereby the direction of rotation of the friction-disks is dependent on the friction-roller driven by the motor.

4. The combination with a rotative shaft threaded oppositely at its ends, of friction-disks journaled thereon and having their adjacent faces in parallel planes, means on the threaded ends of said shaft adapted when the shaft is rotated to move said disks oppositely, a pair of friction-rollers engaged between said disks and in mutual peripheral engagement, means for driving each of said friction-rollers thereby rotating the other and said friction-disks.

5. The combination with a rotative shaft, of friction-disks journaled thereon and having their adjacent faces in parallel planes, a pair of friction-rollers engaged between the same and in mutual peripheral engagement, means for driving either of said friction-rollers thereby rotating the other and said friction-disks and means whereby the rotation of said shaft causes said disks to move oppositely to vary the pressure on the friction-rollers.

6. The combination with a shaft having oppositely-threaded ends, of friction-disks journaled thereon having their adjacent faces in parallel planes, a pair of friction-rollers engaged between the same and in mutual peripheral engagement, means on the threaded ends of said shaft adapted to adjust said disks with reference to said rollers, means for driving either of said friction-rollers thereby rotating the other and said friction-disks and a lever rigidly engaged on said shaft acting to move said friction-disks oppositely varying the pressure thereof on the friction-rollers.

7. The combination with friction-disks having their adjacent faces in parallel planes, of a pair of friction-rollers engaged between the same and in mutual peripheral engagement, means for driving either of said friction-rollers thereby rotating the other and said friction-disks, a shaft journaled in said disks, a nut on each end of said shaft adapted to engage with said disks and means for rotating said shaft in said nuts by moving said disks oppositely.

8. The combination with an oppositely-threaded shaft, of revoluble inwardly-facing friction-disks thereon, a nut on each end of said shaft adapted to move said disks oppositely, rollers in peripheral contact and contacting each friction-disk, means acting to drive one of said rollers and means acting to vary the speed of rotation of said friction-disks independently of the speed of rotation of said friction-rollers operated by shifting said rollers simultaneously and radially of said disks.

9. The combination with revoluble inwardly-facing friction-disks, of rollers in peripheral contact and contacting each friction-disk, means acting to drive one of said rollers and means acting to vary the speed of rotation of said friction-disks independently of the speed of rotation of said friction-rollers operated by shifting said rollers simultaneously and radially of the disks, a shaft journaled in said disks and means on the end of said shaft acting when said shaft is rotated to vary the pressure of the disks upon the rollers.

10. The combination with revoluble inwardly-facing friction-disks, of rollers in peripheral contact and contacting each friction-disk, means acting to drive one of said rollers and means acting to vary the speed of rotation of said friction-disks independently of the speed of rotation of said friction-rollers operated by shifting said rollers simultaneously and radially of said disks, a shaft on which said disks are mounted and means related with said shaft whereby partial rotation thereof acts to shift the disks oppositely.

11. The combination with a pair of friction-disks having their adjacent faces in parallel planes, of a pair of friction-rollers engaged between the same and in mutual peripheral engagement, means for driving either of said rollers thereby imparting rotation to the other and to said friction-disks and means acting to shift said rollers simultaneously radially of said disks thereby varying the speed of rotation of the disks and threaded means acting to vary the pressure of said disks on said rollers.

12. In a device of the class described the combination with a shaft, of friction-disks journaled thereon and having the adjacent faces thereof parallel, a pair of friction-rollers in mutual peripheral engagement and in frictional engagement with and between said friction-disks, right and left screw-threads on the ends of said shaft, nuts adapted to engage thereon and held from rotation whereby a partial revolution of said shaft acts to move said friction-disks out of and into engagement with said rollers.

13. The combination with a shaft having right and left threaded ends, of complementally-threaded nuts engaged thereon, hangers in which said nuts non-rotatively engage, friction-disks on said shaft having elongated hubs, an antifriction-bearing between said nuts and the end of each hub and a lever engaged on said shaft and acting by partial revolution thereof to move said friction-disks oppositely.

14. The combination with a shaft having right and left threaded ends, of complementally-threaded nuts engaged thereon, hangers in which said nuts non-rotatively engage, friction-disks on said shaft having elongated hubs, a sprocket-wheel on each hub, an antifriction-bearing between said nuts and the end of each hub and a lever engaged on said shaft and acting by partial revolution thereof to move said friction-disks oppositely.

15. The combination with a shaft having right and left threaded ends, of complementally-threaded nuts engaged thereon, hangers in which said nuts non-rotatively engage, friction-disks on said shaft having elongated hubs and chambered or cored to provide an internal lubricant-receptacle, an antifriction-bearing between said nuts and the ends of each hub and a lever engaged on said shaft and acting by partial revolution thereof to move said friction-disks oppositely.

16. The combination with a shaft having right and left threaded ends, of a complementally-threaded nut on each end, hangers in which said nuts non-rotatively engage, friction-disks journaled on said shaft, an elongated hub on each, antifriction-bearings between the ends of said hub and said nuts, a lever adjustably engaged to said shaft intermediate the hubs and acting to partially rotate the shaft and to move said friction-disks oppositely and one or more friction-rollers engaged between said disks either of said elements acting to rotate the other.

In testimony whereof I have hereunto subscribed my name in the presence of two subscribing witnesses.

JOHN F. KRCMA.

Witnesses:
C. W. HILLS,
W. W. WITHENBURY.